United States Patent [19]

Hamamoto

[11] Patent Number: 5,694,666
[45] Date of Patent: Dec. 9, 1997

[54] CLIP

[75] Inventor: Yoshiaki Hamamoto, Kanagawa, Japan

[73] Assignee: Illinois Tool Works Inc., Glenview, Ill.

[21] Appl. No.: 758,043

[22] Filed: Nov. 27, 1996

[30] Foreign Application Priority Data

Nov. 27, 1995 [JP] Japan .................................. 7-307469

[51] Int. Cl.$^6$ .......................... F16B 21/00; A44B 17/00; A44B 21/00
[52] U.S. Cl. .......................... 24/297; 411/60; 411/387; 411/349; 411/509; 24/453
[58] Field of Search .................. 24/298, 297, 289, 24/453, 489, 457, 458; 411/29, 30, 387, 349, 508–510

[56] References Cited

U.S. PATENT DOCUMENTS

| | | | |
|---|---|---|---|
| D. 293,880 | 1/1988 | Takahashi | 24/297 X |
| 3,309,955 | 3/1967 | Turnbull et al. | 411/349 X |
| 3,810,279 | 5/1974 | Swick et al. | 411/509 |
| 3,988,808 | 11/1976 | Poe et al. | 24/297 X |
| 4,393,551 | 7/1983 | Wollar et al. | 411/349 X |
| 4,810,147 | 3/1989 | Hirohata | 24/453 X |
| 5,142,834 | 9/1992 | Laclave et al. | 24/453 X |
| 5,173,026 | 12/1992 | Cordola et al. | 24/297 X |
| 5,332,347 | 7/1994 | Kimisawa | 411/508 X |
| 5,421,067 | 6/1995 | Akachi et al. | 24/297 |

FOREIGN PATENT DOCUMENTS

| | | |
|---|---|---|
| 51-1898 | 1/1976 | Japan . |
| 53-41848 | 11/1978 | Japan . |

*Primary Examiner*—Peter M. Cuomo
*Assistant Examiner*—Robert J. Sandy
*Attorney, Agent, or Firm*—Schwartz & Weinrieb

[57] ABSTRACT

A clip for fixing an elastic member having a shaft portion disposed so as to be engaged within a mounting opening of the elastic member; and a fall-preventive plate section disposed integrally with the shaft portion so as to be engaged with a circumferential edge section of the mounting opening of the elastic member when the shaft portion is engaged within the mounting opening of the elastic member. The fall-preventive plate section is structured such that an inner circumference of a ring-shaped member having first and second cut end sections is integrated with an outer circumference of a top end section of the shaft portion; and the second cut end section is inclined so as to gradually rise towards the outside of the top end section of the shaft portion as the first cut end section comes closer to the second cut end section in a circumferential direction of the fall-preventive plate section and a top end surface of the first cut end section is deviated towards the outside of a top end section of the shaft portion from a top end surface of the second cut end section.

18 Claims, 5 Drawing Sheets a clip for fixing an elastic member with improved functions of mounting on the elastic member and with improved mounting strength.

CLIP

BACKGROUND OF THE INVENTION

1. Field of The Invention

The present invention relates to a clip and, more particularly, to a clip for fixing an elastic member, such as weather stripping or the like, on a mounting member.

2. Description of The Related Art

There are known various clips for mounting an elastic member on a mounting member. For example, Japanese Patent Publication No. 51-1,898 discloses a clip, for fixing an elastic member to a mounting member, which has a shaft portion with a fall-preventive section, comprising a plate or disc, joined at one end thereof, and an engaging section for engagement with a mounting opening of the mounting member at the other end thereof. The prior art clip is mounted on an elastic member in such a manner that one end side of the fall-preventive plate section is inserted into the mounting opening of the elastic member while forcing the mounting opening open, and the other end side thereof is forced into the mounting opening in the state in which the mounting opening is pushed open, followed by causing the fall-preventive plate section to be engaged with an inner circumferential edge section of the mounting opening of the elastic member. By mounting the clip on the elastic member in the manner as described hereinabove, the clip cannot fall out of or detached from the other end of the shaft portion due to the presence of the fall-preventive plate section.

This type of clip for fixing the elastic member, however, suffers from the disadvantages that it requires the operation for inserting one end of the fall-preventive plate section into the mounting opening of the elastic member while forcing the mounting opening thereof open for causing the other end thereof to be forced into the mounting opening thereof and that, even if the mounting opening is forced open by the one end of the fall-preventive plate section, the mounting opening is not open enough to allow the other end thereof to be readily and smoothly inserted therethrough so that the other end thereof should be pushed into the mounting opening with force. Therefore, this clip is poor in performance in mounting it on an elastic member.

Another type of clip for fixing an elastic member is disclosed in Japanese Patent Publication No. 53-41,848, which comprises a pair of foldable fall-preventive plate sections disposed upon one end section of a shaft portion and centered around the one end section thereof, and an engaging section, for engagement with a mounting opening of a mounting member, at the other end section of the shaft portion. This prior art clip is mounted on an elastic member in such a way that the pair of fall-preventive plate sections in their folded state are inserted into the mounting opening of the mounting member and the fall-preventive plate sections are then opened to cause them to be engaged with a circumferential edge section of the mounting opening of the elastic member, thereby allowing the clip to be fixed to the elastic member without falling out of or being detached from the other end of the shaft portion due to the presence of the open fall-preventive plate sections.

This type of the clip, however, presents the drawback that a continuous section between each of the fall-preventive plate sections and the one end side of the shaft portion is made thinner than the rest so as to be foldable. Therefore, the thin continuous section may be readily broken off readily when stress is focused thereonto while sustaining the fall-preventive function during a long period of time.

OBJECT OF THE INVENTION

Therefore, the present invention has the object to provide

SUMMARY OF THE INVENTION

In order to achieve the object, in a major aspect, the present invention provides a clip for fixing an elastic member, comprising a shaft portion disposed so as to be engaged with a mounting opening of the elastic member; and a fall-preventive plate section disposed integrally with the shaft portion so as to be engaged with a circumferential edge section of the mounting opening of the elastic member when the shaft portion is engaged with the mounting opening of the elastic member; wherein the fall-preventive plate section has an inner circumference of a ring-shaped member having first and second cut end sections integrated with an outer circumference of a top end section of the shaft portion; and the first cut end section is inclined so as to gradually rise toward the outside of the top end section of the shaft portion as the first cut end section comes closer to the second cut end section in a circumferential direction of the fall-preventive plate section, and a top end surface of the first cut end section is deviated toward the outside of a top end section of the shaft portion from a top end surface of the second cut end section.

In this embodiment of the clip according to the present invention, the first cut end section of the clip is configured in such a way that, as it gradually rises towards the outside of the shaft portion as it comes closer to the second cut end section in a circumferential direction of the fall-preventive plate section, a portion of the inner circumferential edge section of the mounting opening of the elastic member is allowed to abut an inner surface of the rising part of the fall-preventive plate section simply by pressing the fall-preventive plate section onto the mounting opening thereof and pushing it into the mounting opening thereof and, in this state, the fall-preventive plate section is rotated about the shaft portion so as to thereby rotate it relative to the inner circumferential edge section of the mounting opening of the elastic member, whereby the inner circumferential edge section of the mounting opening of the elastic member is guided along the inner surface of the rise part of the fall-preventive plate section and slid down gradually into the inner surface thereof. As a result, the fall-preventive plate section is eventually caused to pass through the mounting opening of the elastic member and engaged with the inner circumferential edge section of the mounting opening of the elastic member.

Therefore, the clip according to this embodiment of the present invention does not require any laborious operation for forcing the mounting opening of the elastic member open and forcibly pushing the fall-preventive section into the mounting opening thereof because it can be forced into and through the mounting opening and engaged with the inner circumferential edge section of the mounting opening simply by rotating the shaft portion in such a state that the first cut end section is pressed onto the mounting opening of the elastic member so as to be inserted thereinto. This operation can fix the clip to the mounting opening of the elastic member with a high degree of smoothness and efficiency, thereby improving the performance for mounting the clip on the elastic member.

Further, in view of the fact that the fall-preventive plate section is joined integrally to the shaft portion in a non-movable state and that the fall-preventive plate section is structured in a state which is not foldable against the shaft portion, no thin portion is formed at positions on which stress is focused. Therefore, the clip according to this embodiment of the present invention does not pose any risk that a thin portion thereof will be broken off, thereby allowing the clip to fall off of or be detached from the mounting opening of the elastic member. This serves as improvements in the strength of the clip itself and in the intensity for mounting the clip on the elastic member.

In addition, the clip according to the major embodiment of the present invention is configured in such a way that, as the ring-shaped member is used for the fall-preventive plate section, the fall-preventive plate section can be engaged with the inner circumferential edge section of the mounting opening of the elastic member over a wide range in a circumferential direction of the inner circumferential edge section, thereby increasing the area of engagement and serving disperse the force acting upon the fall-preventive plate section into a wide area of the inner circumferential edge section of the mounting opening of the elastic member. This can reduce the burden imposed upon the fall-preventive plate section and the inner circumferential edge section of the mounting opening of the elastic member upon engagement of the clip with the elastic member, thereby further improving the intensity of mounting the clip on the elastic member.

In a preferred embodiment according to the present invention, the clip is further configured such that an outer circumferential edge section of the first cut end section is inclined so as to come closer to the shaft portion as it comes closer to the second cut end section in a circumferential direction of the fall-preventive plate section so that the fall-preventive plate section tapers in width as it rises. This arrangement of the outer circumferential edge section of the first cut end section facilitates the insertion of the fall-preventive plate section of the clip into the mounting opening of the elastic member, thereby improving performance in mounting the clip on the elastic member.

In another preferred embodiment according to the present invention, the clip is further configured such that a top end surface of the first cut end section is inclined so as to come closer to the second cut end section as it is directed toward the outside in the radial direction of the fall-preventive plate section. Therefore, when the fall-preventive plate section is pressed onto the mounting opening of the elastic member so as to be inserted into the mounting opening thereof, the top end surface of the first cut end section can guide the inner circumferential edge section of the mounting opening of the elastic member into abutment therewith and slide the inner circumferential edge section thereof down into the side of the second cut end section of the elastic member, thereby causing a portion of the inner circumferential edge section to come into abutment with the outer circumferential edge section of the fall-preventive plate section. Thereafter, the fall-preventive plate section is rotated about the shaft portion in the state that the portion of the inner circumferential edge section of the mounting opening of the elastic member abuts the outer circumferential edge section of the fall-preventive plate section. Upon rotation, the fall-preventive plate section is forced into and passes through the mounting opening of the elastic member and is engaged with the inner circumferential edge section of the mounting opening. Thus, the operations prior to the operation for rotating the fall-preventive plate section about the shaft portion can be simplified.

Furthermore, in a further preferred embodiment of the present invention, the clip for fixing the elastic member is configured in such a manner that the inner circumferential edge section of the mounting opening of the elastic member is guided along the top end surface of the first cut end section, and a portion of the inner circumferential edge section of the mounting opening of the elastic member is caused to slide relatively downwardly upon the outer circumferential edge section of the first cut end section, followed by bringing the portion of the inner circumferential edge section of the elastic member into abutment with the outer circumferential edge section of the first cut end section. As the clip is provided with an engaging claw at a portion intersecting the top end surface of the first cut end section with the outer circumferential edge section of the first cut end section, the engaging claw can suppress the inner circumferential edge section of the mounting opening of the elastic member from falling away or being detached from the first cut end section in association with the second cut end section. Therefore, the portion of the inner circumferential edge section of the mounting opening of the elastic member can be readily engaged with the engaging claw. This structure of the clip enables a smooth operation for rotating the fall-preventive plate section about the shaft portion.

In a still further preferred embodiment of the present invention, the clip for fixing the elastic member is structured in that a guiding projection is provided at a top end portion of the shaft portion and it tapers in width toward the outside of the top end section of the shaft portion. Therefore, the clip can be readily mounted on the mounting opening of the elastic member with ease by inserting the top end section of the shaft portion and the first cut end section of the fall-preventive plate section into the mounting opening thereof, thereby facilitating the positioning of the first cut end section of the fall-preventive plate section at the time of pressing on the mounting opening and making the following operations smooth.

In a still further preferred embodiment according to the present invention, the clip is configured such that, as the shaft portion is provided with a flange section at a position inside of the fall-preventive plate section as considered in the axial direction of the shaft portion, the flange section can prevent the shaft portion from entering the mounting opening of the elastic member to a deeper position after the top end section of the shaft portion has been inserted into and forced to pass through the mounting opening of the elastic member, thereby allowing the flange section to hold the clip in an unmovable state with respect to the mounting opening of the elastic member which is now in association with the fall-preventive plate section.

BRIEF DESCRIPTION OF THE DRAWINGS

Other objects, features and advantages of the present invention will become apparent in the course of the description which follows, with reference to the accompanying drawings, in which like reference characters designate like or corresponding parts throughout the several views, and wherein:

5 shows the state of pressing the clip onto the mounting opening of the elastic member; FIG. 6 shows the state from the state of FIG. 5 in which the clip is being inserted into the mounting opening thereof; FIG. 7 shows the state from the state of FIG. 6 in which the clip is being inserted further into the mounting opening thereof; FIG. 8 shows the state from the state of FIG. 7 in which the fall-preventive plate section is starting to be forced into and through the mounting opening thereof; FIG. 9 shows the state from the state of FIG. 8 in which a portion of the inner circumferential edge section of the mounting opening thereof is slid down; and FIG. 10 shows the state from the state of FIG. 9 in which the fall-preventive plate section is entirely forced through the mounting opening thereof,

DESCRIPTION OF THE PREFERRED EMBODIMENTS

Figure 1:
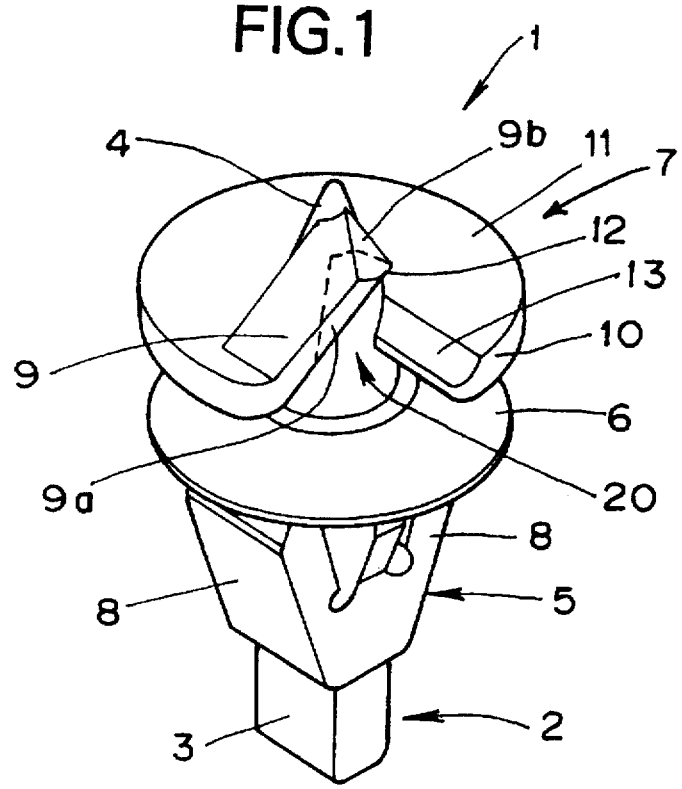
FIG. 1 is a perspective view showing a clip according to an embodiment of the present invention.

The present invention will be described in more detail by way of example with reference to the accompanying drawings.

As shown in FIGS. 1 to 4, reference numeral 1 denotes a plastic clip according to an embodiment of the present invention, which has a shaft portion 2 as a main component thereof.

The shaft portion 2 extends straight in its axial direction and the length thereof in the axial direction may be determined with the mounting on a weather stripping, the mounting on a vehicle body, mounting workability, and the like taken into account, because the clip 1 is to be mounted on the vehicle body as a mounting member for mounting a weather stripping as an elastic member.

Figure 3:
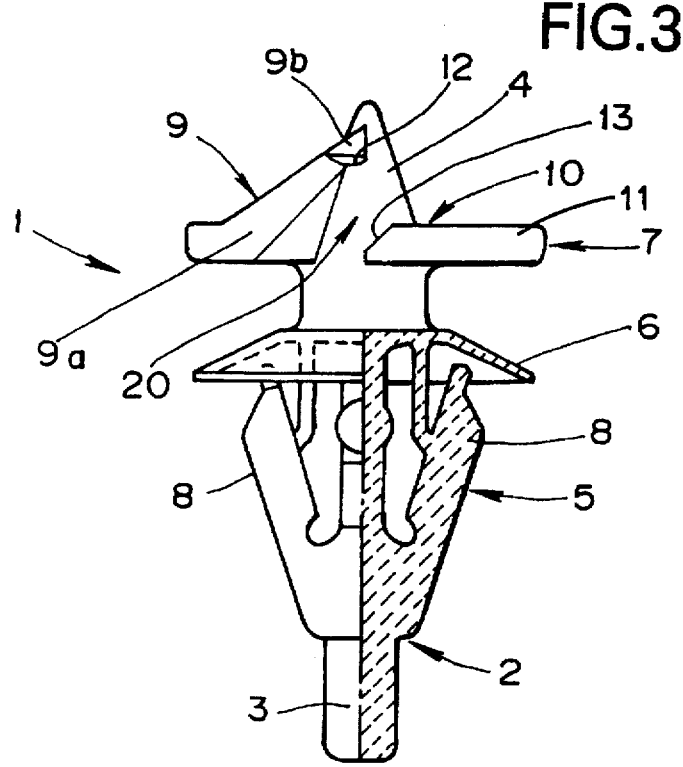
FIG. 3 is a partially sectional front view showing the clip of FIG. 2.
Figure 4:
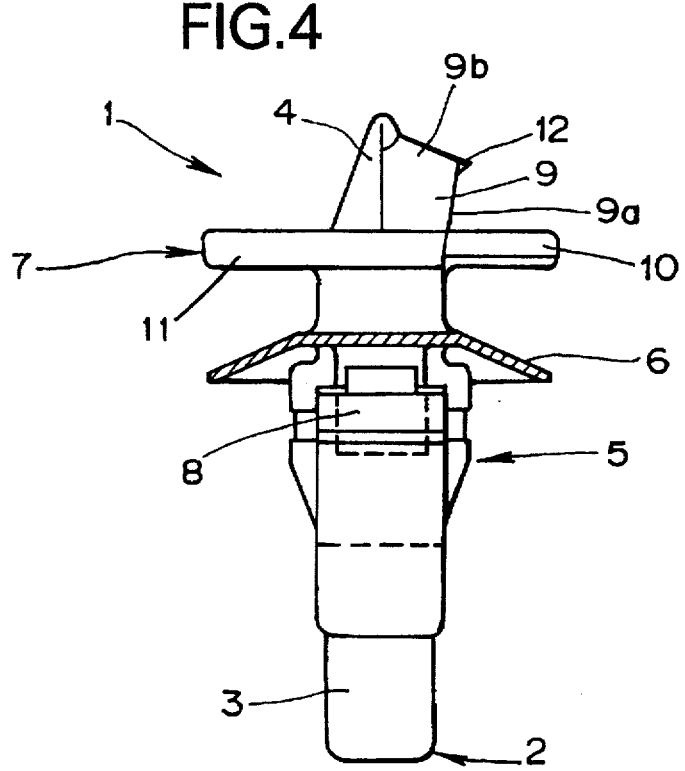
FIG. 4 is a partially sectional left-hand side view showing the clip of FIG. 3.

The shaft portion 2 has its base side or lower end as seen in FIGS. 1, 3 and 4 mounted on a vehicle body and its top or upper end as seen in FIGS. 1, 3 and 4 mounted on a weather stripping as an elastic member. The dimension of the base end portion of the shaft portion 2 is set to be as large as a mounting opening provided in the vehicle body for mounting the shaft portion 2 so as to be mounted thereon. On the other hand, the dimension of the top end portion thereof is set to be as large as a mounting opening provided in the weather stripping so as to permit the weather stripping to be mounted thereon.

The shaft portion 2 of the clip 1 has a clamping section 3 at its base or lower end portion as seen in FIGS. 1, 3 and 4 and an inserting section 4 as a guide projection at its top or portion upper end portion as seen in FIGS. 1, 3 and 4. The clamping section 3 is a portion to be clamped by an automatic clamping machine or the like. It has a non-circular sectional shape, such as a prismatic shape, so as to allow the automatic clamping machine or the like to readily clamp the clip and suppress the clip from relatively rotating at the time of clamping. The inserting section 4 is of a generally conical shape in which the shaft portion 2 becomes gradually smaller in dimension as its portion comes closer to the top end or upper portion in FIG. 3 of the shaft portion 2.

The shaft portion 2 comprises an engagement section 5, a flange section 6 and a fall-preventive plate section 7 in this order from the clamping section 3 to the inserting section 4.

The engagement section 5 is provided with a pair of engaging claws 8 so as to be expandable and contractible in order to allow the base end of the shaft portion 2 to be mounted in a mounting opening disposed in a vehicle body. The engaging claws 8 are allowed to be temporarily contracted at the time of insertion into the mounting opening of the vehicle body and expanded to its original size after insertion, thereby allowing an engagement with a peripheral edge section of the mounting opening.

The flange section 6 has the functions of preventing the shaft portion 2 on the top end portion thereof from being inserted too deeply into the mounting opening of the weather stripping and on the base end portion thereof from being inserted too deeply into the mounting opening of the vehicle body. In order to achieve the functions, the flange section 6 has a diametrical extent which is greater than the mounting openings of the weather stripping and the vehicle body.

The fall-preventive plate section 7 comprises a ring-shaped member 11 with a pair of first and second cut end sections 9 and 10 and it is shaped into a generally disk plate extending around the shaft portion 2. The ring-shaped member 11 has an inner circumference arranged so as to engage an outer circumference of the inserting section 4 of the shaft portion 2.

Figure 2:
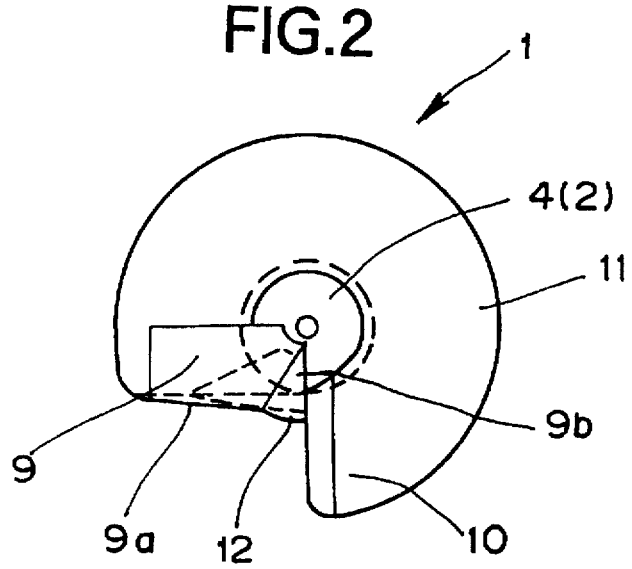
FIG. 2 is a plane view showing the clip of FIG. 1.

As shown in FIGS. 1 and 3, the first cut end section 9 of the fall-preventive plate section 7 is disposed so as to be inclined rising gradually towards the outside of the top end portion inserting section 4 of the shaft portion 2 as it comes closer to the second cut end section 10 thereof in the circumferential direction of the shaft portion 2. As shown in FIG. 2, an outer circumferential section 9a of the first cut end section 9 tapers towards the shaft portion 2 as it comes closer to the second cut end section 10 in the circumferential direction of the fall-preventive plate section 7.

Further, as shown in FIG. 1, the arrangement of the first and second cut end sections 9 and 10 provides a cut-away space 20 having a given extent in the axial direction of the shaft portion 2 between the first and second cut end sections 9 and 10, respectively. The first cut end section 9 tapers so that its width to become gradually smaller at its end surface 9b approaches a position in the vicinity of the end of the inserting section 4.

In order to provide the end surface section 9b of the first cut end section 9 with the function as a guide surface, the end surface section 9b of the first cut end section 9 is inclined downward as seen in FIG. 3 so as to come closer to the second cut end section 10 as it extend toward to the outside in the radial direction of the fall-preventive plate section 7. Further, the end surface 9b thereof is disposed so as to expand in the circumferential direction of the fall-preventive plate section 7 as it extends towards the outside in the radial direction of the fall-preventive plate section 7.

The end surface 9b of the first cut end section 9 is disposed so as to project, at the portion intersecting the outer circumferential edge section 9a, outwardly from the outer circumferential edge section 9a to some extent in the radial direction of the fall-preventive plate section 7, thereby constituting an engaging claw 12 at the portion the end surface 9b intersects the outer circumferential edge section 9a.

On the other hand, the second cut end section 10 is provided at its end section with a guide surface 13 extending in the radial direction of the fall-preventive plate section 7 end inclining so as to face the inner surface of the first cut end section 9, as shown in FIG. 3.

Now, a description will be made as to mounting the clip 1 on a weather stripping as an elastic member with reference to FIGS. 5 to 10.

Figure 5:
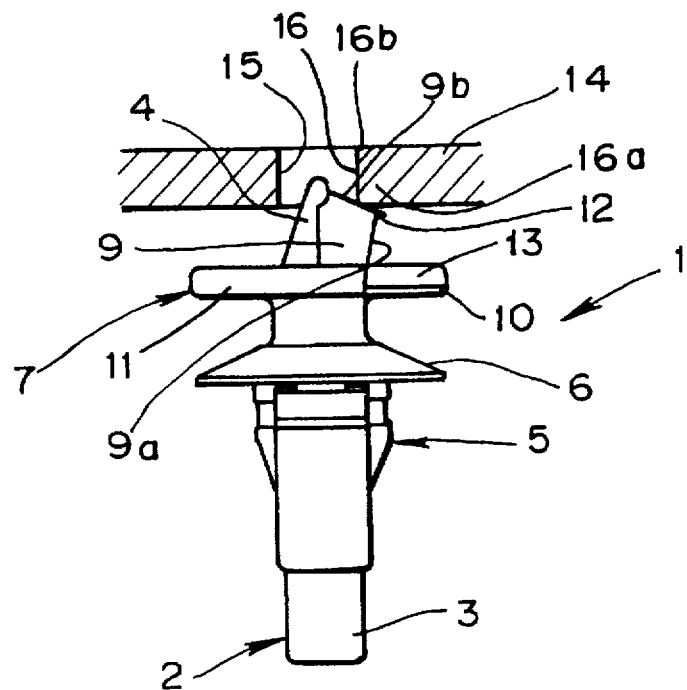
FIGS. 5 to 10 are each a side view showing the clip, with an elastic member in section, for explanation of the consecutive states of the clip in each stage of mounting the clip on a weather stripping as an elastic member, in which FIG.

As shown in FIG. 5, the position in which to mount the clip 1 on a weather stripping 14 is determined by taking advantage of the structure of the clip 1 so adapted as to allow the inserting section 4 to be readily inserted into a mounting opening 15 of the weather stripping 14. Upon insertion, a side surface of the inserting section 4 and the end surface 9b of the first cut end section 9 are brought into abutment with an inner circumferential edge section 16a on the inserting side of the mounting opening 15. It is to be noted in the description which follows that the inner circumferential edge section of the mounting opening 15 as a whole, including the inner circumferential edge section 16a on the inserting side of the mounting opening 15 and an inner circumferential edge section 16b on the engaging side, may from time to time be referred to collectively as reference numeral 16 for brevity of description. Then, as shown in FIGS. 6 to 8, the inserting section 4 and the first cut end section 9 are allowed to be forced into the mounting opening 15 of the weather stripping 14 in opposition to the elastic force of the inner circumferential edge section 16 of the mounting opening 15.

Figure 6:
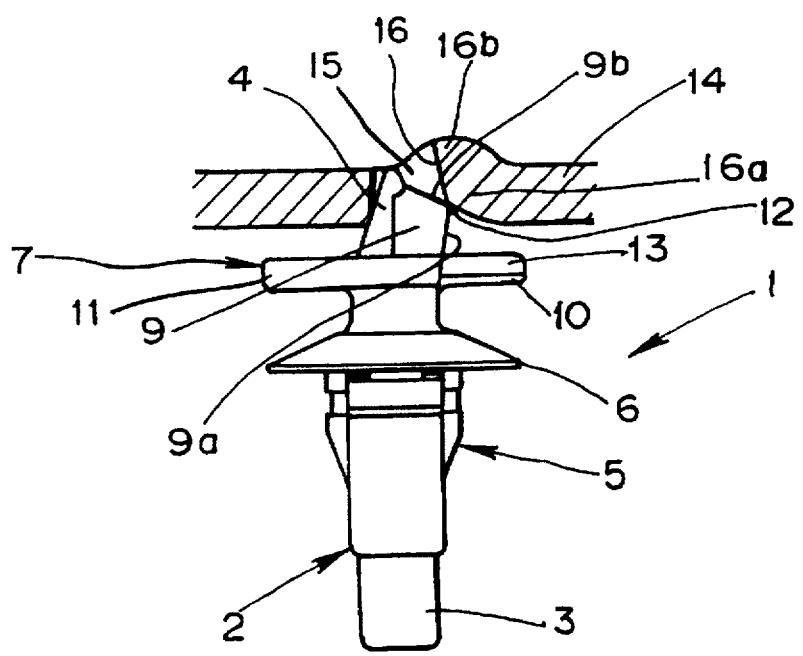

As shown in FIG. 6, as the clip 1 is being forced into the mounting opening 15 of the weather stripping 14, the inner circumferential edge section 16 of the weather stripping 14 is caused to rise towards the outside, expanding the mounting opening 15 of the weather stripping 14 so as to allow the inserting section 4 and the first cut end section 9 to enter into and through the mounting opening 15.

Figure 7:
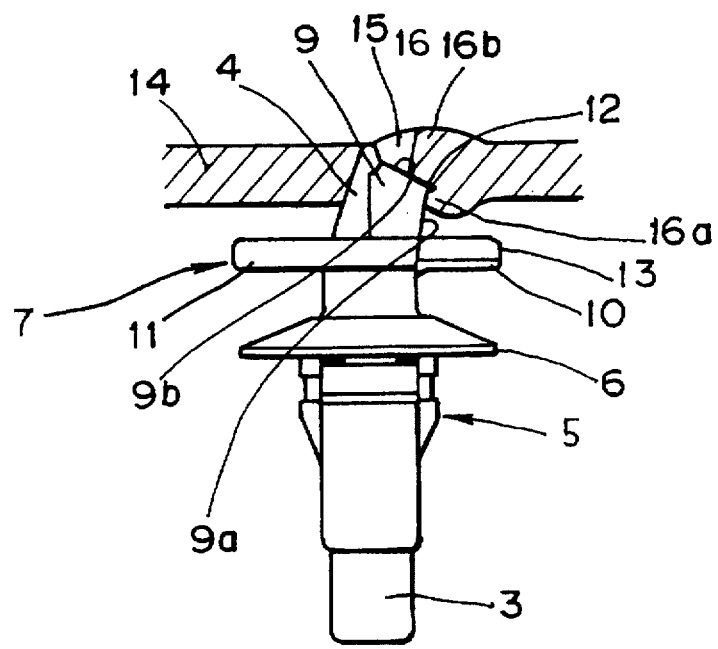
Figure 8:
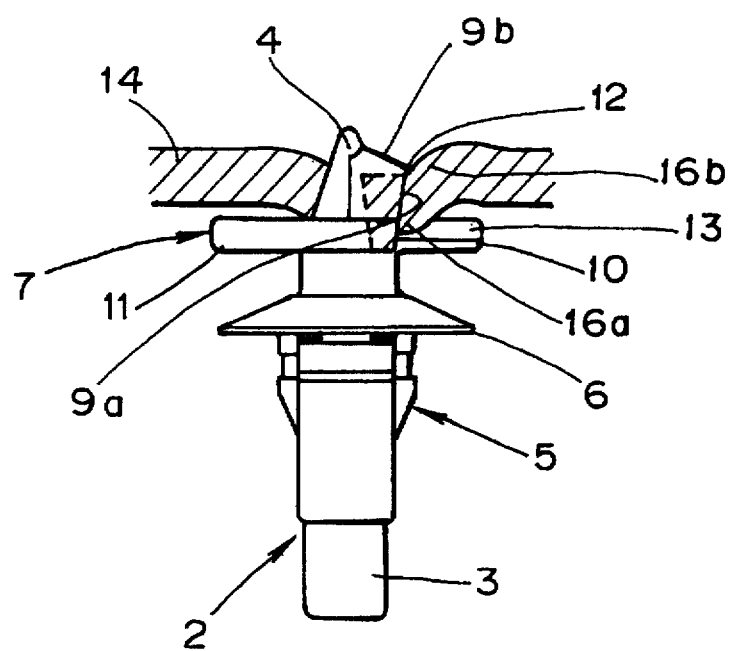

Then, as shown in FIG. 7, as the inserting section 4 and the first cut end section 9 are allowed to enter into the mounting opening 15, the inner circumferential edge section 16 of the mounting opening 15, mainly the inner circumferential edge section 16a on the inserting side, is smoothly guided by the end surface 9b of the first cut end section 9 and the side surface of the inserting section 4 and caused to slide relatively downwardly onto the outer circumferential edge section 9a of the first cut end section 9 in the cut-away space 20. Further, as shown in FIG. 8, as the inserting section 4 and the first cut end section 9 are caused to enter into the mounting opening 15 to the deepest position, both the inner circumferential edge sections 16a and 16b on the inserting and engaging sides, respectively, are caused to slide downwardly onto the outer circumferential edge section 9a of the first cut end section 9 along the surface of the first cut end section 9 and the side surface of the inserting section 4. Then, the inner circumferential edge section 16a of the mounting opening 15 is brought into abutment with the outer circumferential edge section 9a of the first cut end section 9. In this state, the inner circumferential edge section 16 of the mounting opening 15 is clamped by the engaging claw 12 and the second cut end section 10.

Figure 9:
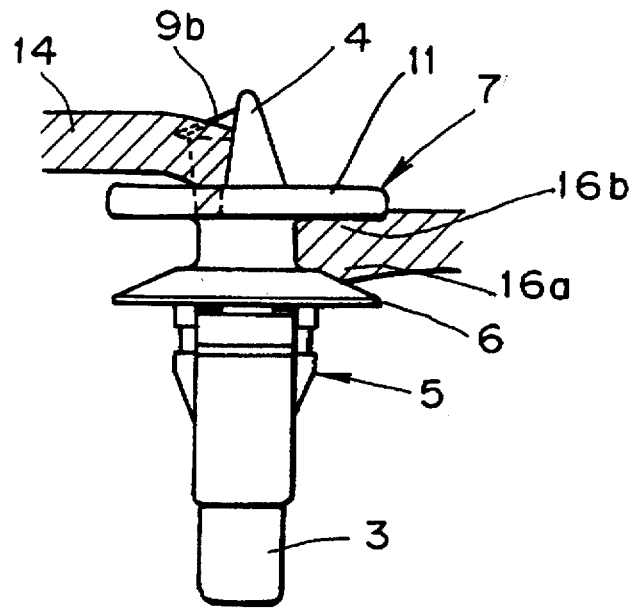
Figure 10:
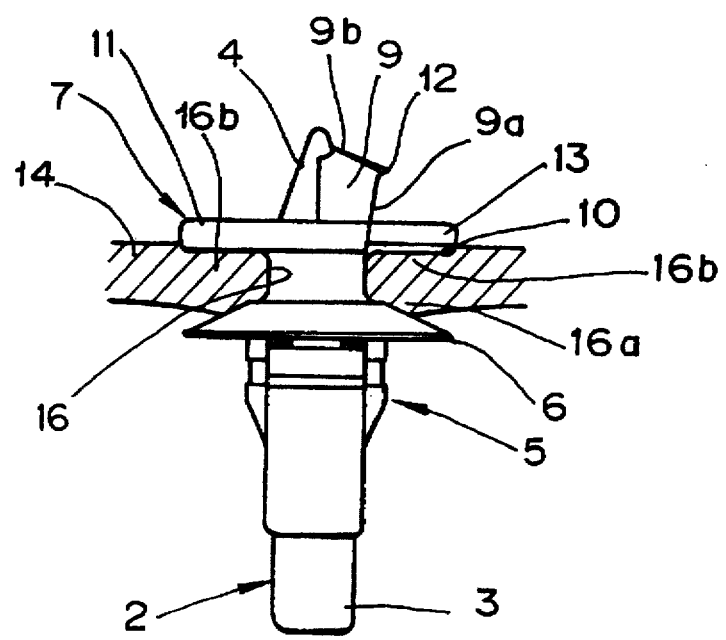

Thereafter, a rotating force is applied to the clanging section 3 of the shaft portion 2 to rotate the fall-preventive plate section 7 about the shaft portion 2, in such a state that a portion of the inner circumferential edge section 16 of the mounting opening 15 is caused to be in abutment with the outer circumferential edge section 9a of the first cut end section 9. This allows the fall-preventive plate section 7 to rotate relative to the inner circumferential edge section 16, thereby forcing the outer circumferential edge section 9a of the first cut end section 9 and the guide surface 13 of the second cut end section 10 to allow the inner circumferential edge section 16 thereof to enter the inner side of the fall-preventive plate section 7 and allow the fall-preventive plate section 7 to be disposed above the inner circumferential edge section 16, as shown in FIG. 9. As the rotation of the clamping section 3 is continued, the fall-preventive plate section 7 is eventually allowed to fully pass through the mounting opening 15 of the weather strip 14, as shown in FIG. 10, thereby engaging the fall-preventive plate section 7 with the inner circumferential edge section 16b on the engaging side of the mounting opening 15.

The clip 1 is mounted on the weather stripping 14 at plural positions in the manner as described hereinabove, and the clip 1 so mounted on the weather stripping 14 is then inserted into a mounting opening of a vehicle body from the base side, thereby allowing the engagement section 5 to be engaged with the vehicle body so as to consequently mount the weather stripping 14 on the vehicle body. This mounting operation can preferably be conducted by an automatic mounting machine, although it can be done manually.

EFFECTS OF THE INVENTION

By using the clip 1 having the structure as described hereinabove, the clip 1 can be mounted in the mounting opening 15 of the weather stripping 14 with extreme smoothness and readiness. In other words, the clip 1 can be mounted on the weather stripping 14 in such a manner that the fall-preventive plate section 7 of the clip 1 is allowed to pass through the mounting opening 15 of the weather stripping 14 and engage with the inner circumferential edge section 16 of the mounting opening 15, more specifically the inner circumferential edge section 16b thereof on the engaging side, simply by pressing the first cut end section 9 onto the weather stripping 14 so as to allow insertion into the mounting opening 15 and rotating the shaft portion 2 in this state. This does not require the laborious work of forcefully opening the mounting opening of a weather stripping for inserting a clip and therefore the clip according to the present invention can be mounted on the weather stripping with great ease, thereby improving performance of the mounting of such clips on weather strippings.

Further, as the width of the first cut end section 9 tapers as the first cut end section 9 rises and the top end portion of the inserting section 4 is of a generally conical shape, the top end portion of the inserting section 4 and the first cut end section 9 can be inserted into the mounting opening 15 of the weather stripping 14 with ease and smoothness, thereby enabling the ready positioning of the first cut end section 9 upon performance of such an operation of pressing the clip 1 into the mounting opening 15 of the weather stripping 14 in order to smoothen operations that follow.

As the inserting section 4 is being inserted into the mounting opening 15 of the weather stripping 14, the inner circumferential edge section 16 of the mounting opening 15 is guided smoothly by the top end surface 9b of the first cut end section 9 and caused to slide downwardly onto the second cut end section 10 so as to come into abutment with the outer circumferential edge section 9a of the first cut end section 9. As a portion of the inner circumferential edge section 16 thereof is clamped and held in this state by the engaging claw 12 and the second cut end section 10, the clip 1 is prevented from being detached from the inner circumferential edge section 16 so that the operation prior to the operation of rotating the fall-preventive plate section 7 about the shaft portion 2 can be finished with great ease and high effectiveness.

Furthermore, in this instance, as the fall-preventive plate section 7 is joined integrally to the shaft portion 2 in an unmovable manner and the fall-preventive plate section 7 is structured so as not to be foldable against the shaft portion 2, no thin portion is formed at any location upon which stress focuses. Accordingly, no rupture may be caused to occur at any portion, thereby strengthening the intensity of the clip 1 and improving the mounting strength.

In addition to improvements in the mounting intensity from the point of view of the improved strength of the clip 1 in the manner as described hereinabove, as the ring-shaped member 11 is used as the clip 1 and the clip 1 in turn is provided with the fall-preventive plate section 7 so as to allow the inner circumferential edge section 16 of the mounting opening 15 of the weather stripping 14 to be engaged therewith over a wide range in the circumferential direction, the force acting upon the fall-preventive plate section 7 can be widely dispersed throughout in the inner circumferential edge section 16 of the mounting opening 15 thereof, thereby reducing the burden to be imposed upon the fall-preventive plate section 7 and the inner circumferential edge section 16 of the mounting opening 15 thereof. Therefore, as a result, the mounting strength of the clip 1 on the weather stripping 14 can be improved.

Further, as the operations as described hereinabove can be conducted as a result of the first cut end section 9 being joined to the inserting section 4 and the like, the first cut end section 9 is prevented from being disposed in an overhung state, thereby preventing the first cut end section 9 from being bent during the rotation of the fall-preventive plate section 7 about the shaft portion 2 or at the time of the operation of pressing the first cut end section 9 into the mounting opening 15 of the weather stripping 14. Therefore, these operations can be conducted with ease and certainty.

Moreover, when the clip 1 is to be mounted on the weather stripping 14 by means of an automatic mounting machine, it can be mounted thereon simply by pressing the first cut end section 9 into the mounting opening 15 of the weather stripping 14 and then rotating the shaft portion 2 with the clip 1 kept in this state. Therefore, although it is required to orient the automatic mounting machine in a vertical direction, the machine is not required to be oriented in a horizontal direction, saving space in which to dispose the machine and parts.

It is to be understood herein that the present invention is not to be interpreted in any respect so as to be restricted to the embodiments and examples as described hereinabove and that the present invention is construed as encompassing any modifications and variations without departing from the spirit and scope of this invention.

In this sense, for example, it should be understood that the following variations and modifications can be construed as being encompassed in the scope of the present invention.

The elastic member is not restricted to a weather stripping and the clip according to the present invention can be applied to any material having an elastic force.

It is also possible to make the width of the first cut end section 9 constant although in the embodiments as described hereinabove the first cut end section 9 tapers in width towards the inserting section 4.

It is further possible to dispose the first cut end section 9 in such a manner that the first cut end section 9 can only project directly from the fall-preventive plate section 7 without the disposition of the inserting section 4.

The fall-preventive plate section 7, the flange portion 6, the engagement portion 5 and the like may be formed integrally with the shaft portion 2 or joined to a separate member. In any case, in connection with the aforenoted existence of various modifications and variations, it is understood that within the scope of the appended claims, the present invention may be practiced otherwise than as specifically described herein.

What is claimed is:

1. A clip for mounting and retaining an elastic member, having an aperture defined therethrough, upon a support structure, comprising a shaft portion having a longitudinal axis and a substantially pointed tip formed upon one end of said shaft portion for facilitating insertion of said one end of said shaft portion through an aperture defined within an elastic member; and a radially extending, annular fall-preventive plate member fixedly mounted upon said shaft portion at an axial position which is spaced from said substantially pointed tip formed upon said one end of said shaft portion;

said fall-preventive plate member comprising first and second cut end sections extending substantially radially between said shaft portion of said clip upon which said fall-preventive plate member is mounted and an external peripheral edge portion of said annular fall-preventive plate member, said first and second cut end sections being circumferentially spaced from each other so as to define a slot therebetween, and said first cut end section being inclined so as to extend downwardly and radially outwardly from said substantially pointed tip formed upon said one end of said shaft portion and toward said external peripheral edge portion of said annular fall-preventive plate member so as to guide an inner circumferential wall portion of an elastic member, which partially defines the aperture formed within the elastic member, from a first axial position upon said shaft portion of said clip which is located between a first side of said fall-preventive plate member and said substantially pointed tip formed upon said one end of said shaft portion, through said slot defined between said first and second cut end sections of said fall-preventive plate member, and to a second axial position upon said shaft portion of said clip which is located upon a second side of said fall-preventive plate member which is opposite to said first side of said fall-preventive plate member, as said substantially pointed tip of said shaft portion of said clip is inserted into the aperture of the elastic member, whereupon rotation of said clip around said axis of said shaft portion, the entire elastic member is disposed upon said second side of said fall-preventive plate member so as to be mounted upon said clip and retained thereon, without being able to be readily detached therefrom, by said fall-preventive plate member.

2. The clip as set forth in claim 1, wherein:
said substantially pointed tip of said shaft portion has a substantially conical configuration.

3. The clip as set forth in claim 1, wherein:
said first and second cut end sections of said fall-preventive plate member are disposed substantially perpendicular to each other.

4. The clip as set forth in claim 1, further comprising:
a flange member fixedly mounted upon said shaft portion and axially spaced from said fall-preventive plate member so as to cooperate with said second side of said fall-preventive member and thereby retain an apertured elastic member entrapped between said flange member and said second side of said fall-preventive plate member.

5. The clip as set forth in claim 4, further comprising:
flexible claw means mounted upon said shaft portion and axially spaced from said flange member so as to cooperate with said flange member and thereby capture a support member therebetween upon which said clip is to be mounted so as to in turn mount the elastic member upon the support member.

6. The clip as set forth in claim 5, wherein:
said clip comprising said shaft portion, said fall-preventive plate member, said flange member, and said flexible claw means comprises a one-piece component fabricated from a plastic material.

7. The clip as set forth in claim 1, wherein:

said first inclined cut end section comprises a pair of inclined portions disposed substantially perpendicular to each other; and wherein further, a claw member is defined at the intersection of said pair of inclined portions of said first inclined cut end section so as to initially engage an inner circumferential wall portion of an elastic member and thereby guide the inner circumferential wall portion of the elastic member into said slot defined between said first and second cut end sections of said fall-preventive plate member.

8. The clip as set forth in claim 1, wherein:

said second cut end section comprises an inclined portion which faces said first cut end section so as to cooperate with said inclined first cut end section and thereby define said slot which has a predetermined inclination for guiding the inner circumferential wall portion of the elastic member.

9. The clip as set forth in claim 1, wherein:

said clip comprising said shaft portion and said fall-preventive plate member comprises a one-piece component fabricated from a plastic material.

10. In combination, an elastic member and a clip for mounting and retaining said elastic member, having an aperture defined therethrough, upon a support structure, comprising:

an elastic member having an aperture defined therethrough; and a clip comprising a shaft portion having a longitudinal axis and a substantially pointed tip formed upon one end of said shaft portion for facilitating insertion of said one end of said shaft portion of said clip through said aperture defined within said elastic member, and a radially extending, annular fall-preventive plate member fixedly mounted upon said shaft portion of said clip at an axial position which is spaced from said substantially pointed tip formed upon said one end of said shaft portion of said clip;

said fall-preventive plate member comprising first and second cut end sections extending substantially radially between said shaft portion of said clip upon which said fall-preventive plate member is mounted and an external peripheral edge portion of said annular fall-preventive plate member, said first and second cut end sections being circumferentially spaced from each other so as to define a slot therebetween, and said first cut end section being inclined so as to extend downwardly and radially outwardly from said substantially pointed tip formed upon said one end of said shaft portion and toward said external peripheral edge portion of said annular fall-preventive plate member-so as to guide an inner circumferential wall portion of said elastic member, which partially defines said aperture formed within said elastic member, from a first axial position upon said shaft portion of said clip which is located between a first side of said fall-preventive plate member and said substantially pointed tip formed upon said one end of said shaft portion, through said slot defined between said first and second cut end sections of said fall-preventive plate member, and to a second axial position upon said shaft portion of said clip which is located upon a second side of said fall-preventive plate member which is opposite to said first side of said fall-preventive plate member, as said substantially pointed tip formed upon said one end of said shaft portion of said clip is inserted into said aperture of said elastic member, whereupon rotation of said clip around said axis of said shaft portion, the entire elastic member is disposed upon said second side of said fall-preventive plate member so as to be mounted upon said clip and retained thereon, without being able to be readily detached therefrom, by said fall-preventive plate member.

11. The combination as set forth in claim 10, wherein:

said substantially pointed tip of said shaft portion has a substantially conical configuration.

12. The combination as set forth in claim 10, wherein:

said first and second cut end sections of said fall-preventive plate member are disposed substantially perpendicular to each other.

13. The combination as set forth in claim 10, further comprising:

a flange member fixedly mounted upon said shaft portion of said clip and axially spaced from said fall-preventive plate member so as to cooperate with said second side of said fall-preventive plate member and thereby retain said apertured elastic member entrapped between said flange member and said second side of said fall-preventive plate member.

14. The combination as set forth in claim 13, further comprising:

flexible claw means mounted upon said shaft portion of said clip and axially spaced from said flange member so as to cooperate with said flange member and thereby capture a support member therebetween upon which said clip is to be mounted so as to in turn mount said elastic member upon the support member.

15. The combination as set forth in claim 14, wherein:

said clip comprising said shaft portion, said fall-preventive plate member, said flange member, and said flexible claw means comprises a one-piece component fabricated from a plastic material.

16. The combination as set forth in claim 10, wherein:

said first inclined cut end section comprises a pair of inclined portions disposed substantially perpendicular to each other; and wherein further, a claw member is defined at the intersection of said pair of inclined portions of said first inclined cut end section so as to initially engage said inner circumferential wall portion of said elastic member and thereby guide said inner circumferential wall portion of said elastic member into said slot defined between said first and second cut end sections of said fall-preventive plate member.

17. The combination as set forth in claim 10, wherein:

said second cut end section comprises an inclined portion which faces said first cut end section so as to cooperate with said inclined first cut end section and thereby define said slot which has a predetermined inclination for guiding said inner circumferential wall portion of said elastic member.

18. The combination as set forth in claim 10, wherein:

said clip comprising said shaft portion and said fall-preventive plate member comprises a one-piece component fabricated from a plastic material.

* * * * *